(12) United States Patent
Chen

(10) Patent No.: US 7,161,969 B2
(45) Date of Patent: Jan. 9, 2007

(54) LASER MARKING MECHANISM

(75) Inventor: Sean Chen, Taipei (TW)

(73) Assignee: Sean & Stephen Corp., Taipei (TW)

( * ) Notice: Subject to any disclaimer, the term of this patent is extended or adjusted under 35 U.S.C. 154(b) by 260 days.

(21) Appl. No.: 10/999,919

(22) Filed: Dec. 1, 2004

(65) Prior Publication Data

US 2006/0114311 A1    Jun. 1, 2006

(51) Int. Cl.
*H01S 3/08* (2006.01)
*B41J 2/45* (2006.01)

(52) U.S. Cl. .................. 372/101; 372/100; 347/238
(58) Field of Classification Search ................ 372/100, 372/101; 347/238
See application file for complete search history.

(56) References Cited

U.S. PATENT DOCUMENTS 5,418,805 A * 5/1995 Zhiglinsky et al. ........... 372/69
6,631,155 B1 * 10/2003 Nightingale ................. 372/107
2005/0094142 A1 * 5/2005 Takeuchi ..................... 356/364

* cited by examiner

*Primary Examiner*—Armando Rodriguez
(74) *Attorney, Agent, or Firm*—Rosenberg, Klein & Lee

(57) ABSTRACT

A laser marking mechanism includes a housing, a laser module in the housing, first and second reflecting lenses, and a third lens; the laser module has a laser emitting end directed at an inside of the housing; the reflecting lenses are positioned in front of the laser emitting end of the laser module, sloping and parallel to each other, for making a laser beam emitted from the laser emitting end become two laser beams; the third lens is arranged in the housing, across passages of the two laser beams from the reflecting lenses, for changing the two laser beams from the reflecting lenses in such a way that the laser beams will form two light lines on a surface of an object.

7 Claims, 7 Drawing Sheets

LASER MARKING MECHANISM

BACKGROUND OF THE INVENTION

1. Field of the Invention

The present invention relates to a laser marking mechanism, more particularly one, which includes two reflecting lenses, and a lens for changing the shape of laser beams from the reflecting lenses such that two light lines will form on a surface of an object for helping carry out measurement, drilling and cutting process on the object.

2. Brief Description of the Prior Art

Before cutting process is carried out on an object, the object is usually marked with straight lines on the surface. And, before drilling process is carried out on an object, the object is usually marked with a dot or two perpendicular intersecting lines on the surface, at which a drill will be directed.

Therefore, it is a main object of the present invention to provide a laser marking mechanism, with which light lines can be formed on an object in measurement, drilling, and cutting process.

SUMMARY OF THE INVENTION

The laser marking mechanism of the invention includes a housing, a laser module in the housing, first and second reflecting lenses, and a third lens. The laser module has a laser emitting end directed at an inside of the housing for emitting a laser beam therefrom. The first and the second reflecting lenses are positioned in front of the laser emitting end of the laser module, sloping and parallel to each other, for making a laser beam emitted from the laser emitting end become two laser beams. The third lens is arranged in the housing for the two laser beams from the reflecting lenses to travel through, and it is shaped in such a way that the two laser beams will form two light lines on a surface of an object after traveling through it.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
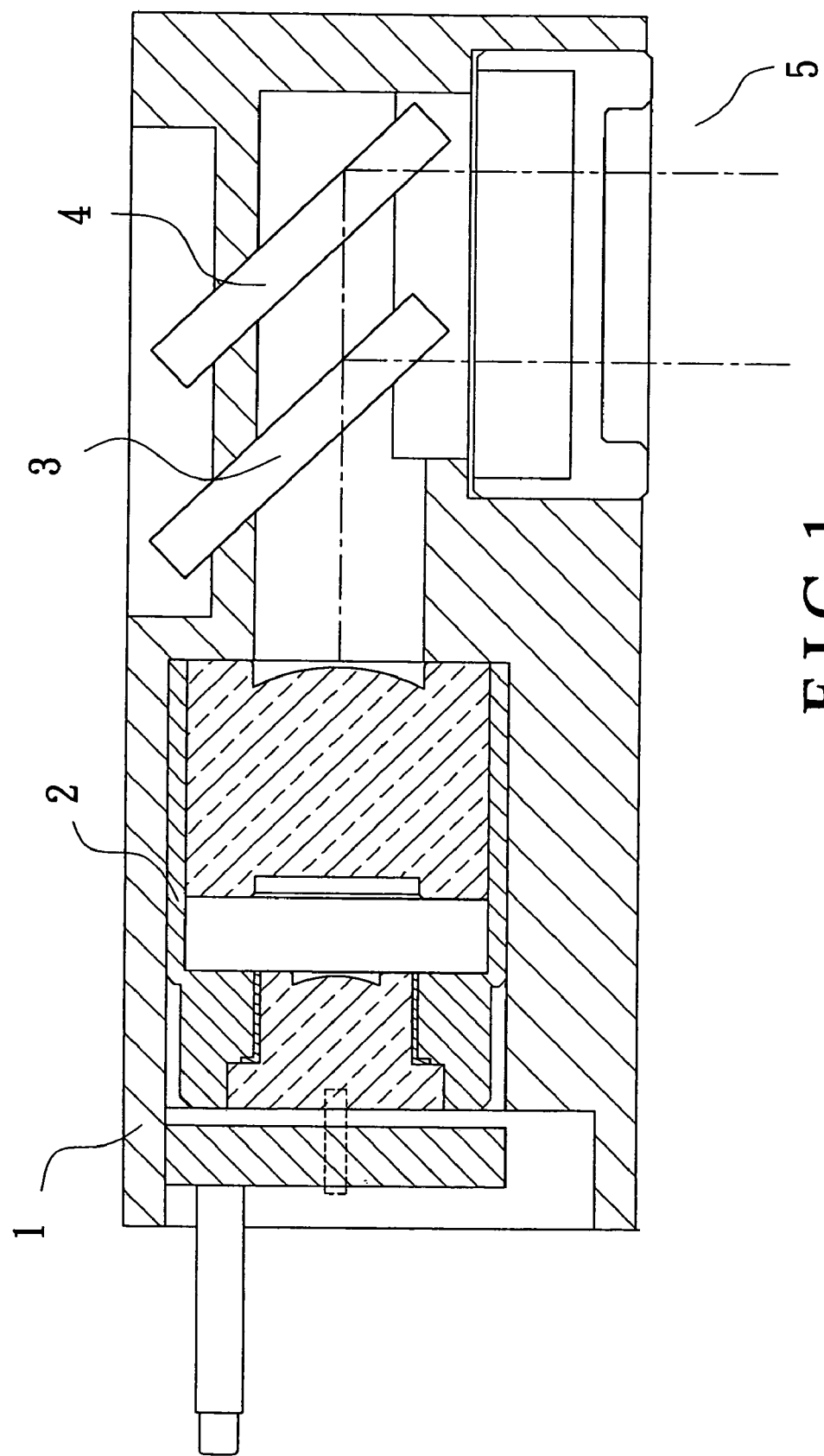
FIG. 1 is a view of the first embodiment of a laser marking mechanism according to the present invention.

Referring to FIG. 1, a first embodiment of a laser marking mechanism includes a housing 1, a laser module 2, first and second reflecting lenses 3 and 4, and a lens 5.

The laser module 2 is disposed in the housing 1 with a laser emitting end thereof arranged in and directed at inside of the housing 1.

The reflecting lenses 3, 4 are disposed in the housing 1, sloping and parallel to each other, such that a laser beam emitted from the laser module 2 will travel onto them. When the laser beam travels onto the first reflecting lens 3, it will be partly reflected by the same. And, the rest of the laser beam will travel through the first reflecting lens 3, and onto the second reflecting lens 4; thus, some of the laser beam will be reflected by the second reflecting lens 4, and two laser beams will form.

Figure 2:
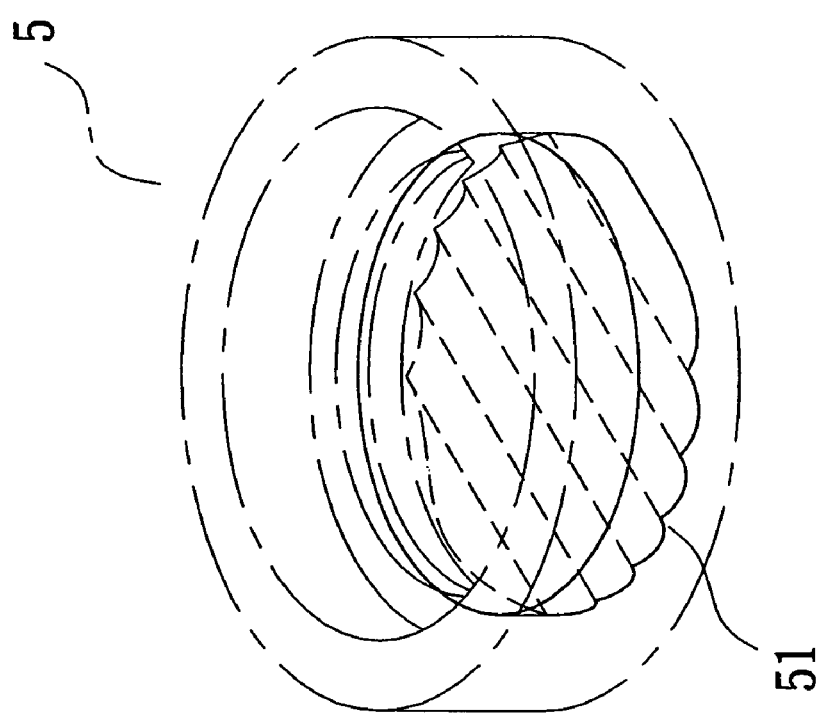
FIG. 2 is a view of the first lens with a corrugated side used for showing two parallel light lines on a surface.

The lens 5 is disposed next to the reflecting lenses 3 and 4 in the housing such that two laser beams will travel through it after a laser beam is emitted from the module 2 and reflected by the reflecting lenses 3 and 4. The lens 5 has a corrugated side; thus, when the laser beams travel through the lens 5 from the lenses 3 and 4, it will be made to change shape, and straight light lines will show on a flat surface facing the lens 5. Referring to FIG. 2, the lens 5 has a corrugated side 51 with all straight ridges being parallel to each other; thus, two laser beams from the lenses 3 and 4 will form two parallel light lines on a flat surface facing the lens 5 after traveling through the lens 5. Thus, people can first make two parallel reference light lines show on the surface of an object with the help of the present laser marking mechanism if they want to carry out cutting process or measurement on the object.

Figure 3:
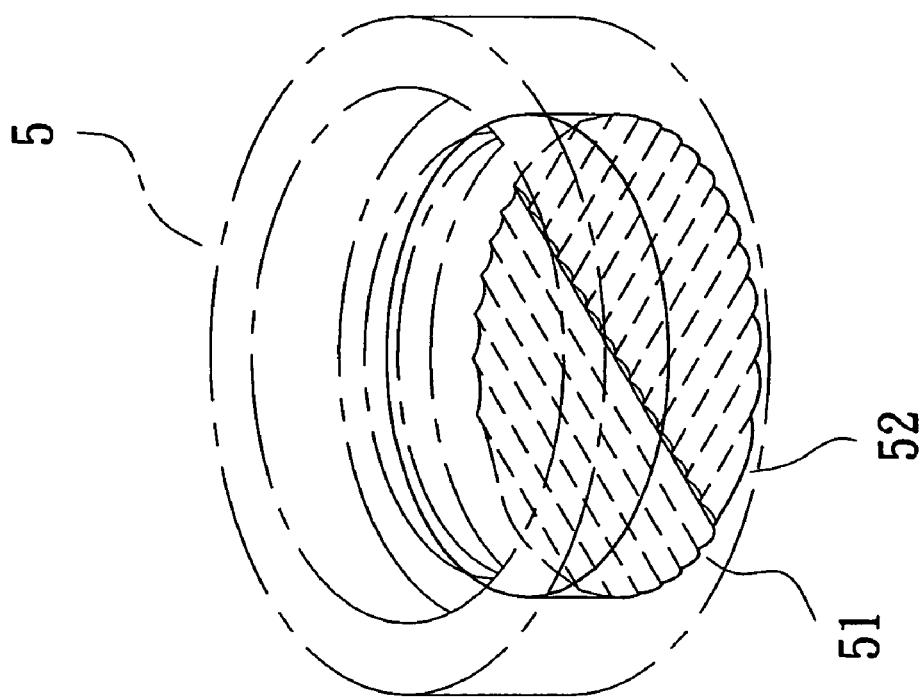
FIG. 3 is a view of the second lens with a corrugated side used for showing two perpendicular light lines on a surface.

Referring to FIG. 3, the lens 5 has first and second corrugated portions 51 and 52 on a same side, which first corrugated portion 51 has parallel straight ridges, and which second corrugated portion 52 has parallel straight ridges perpendicular to those of the first corrugated portion 51; thus, two laser beams from the lenses 3 and 4 will form two perpendicular light lines on a flat surface facing the lens 5 after traveling through the lens 5, which perpendicular light lines will form a light dot at the intersection. Thus, people can first make a reference light dot show on the surface of an object with the help of the present laser marking mechanism if they want to carry out drilling or measurement on the object.

Figure 4:
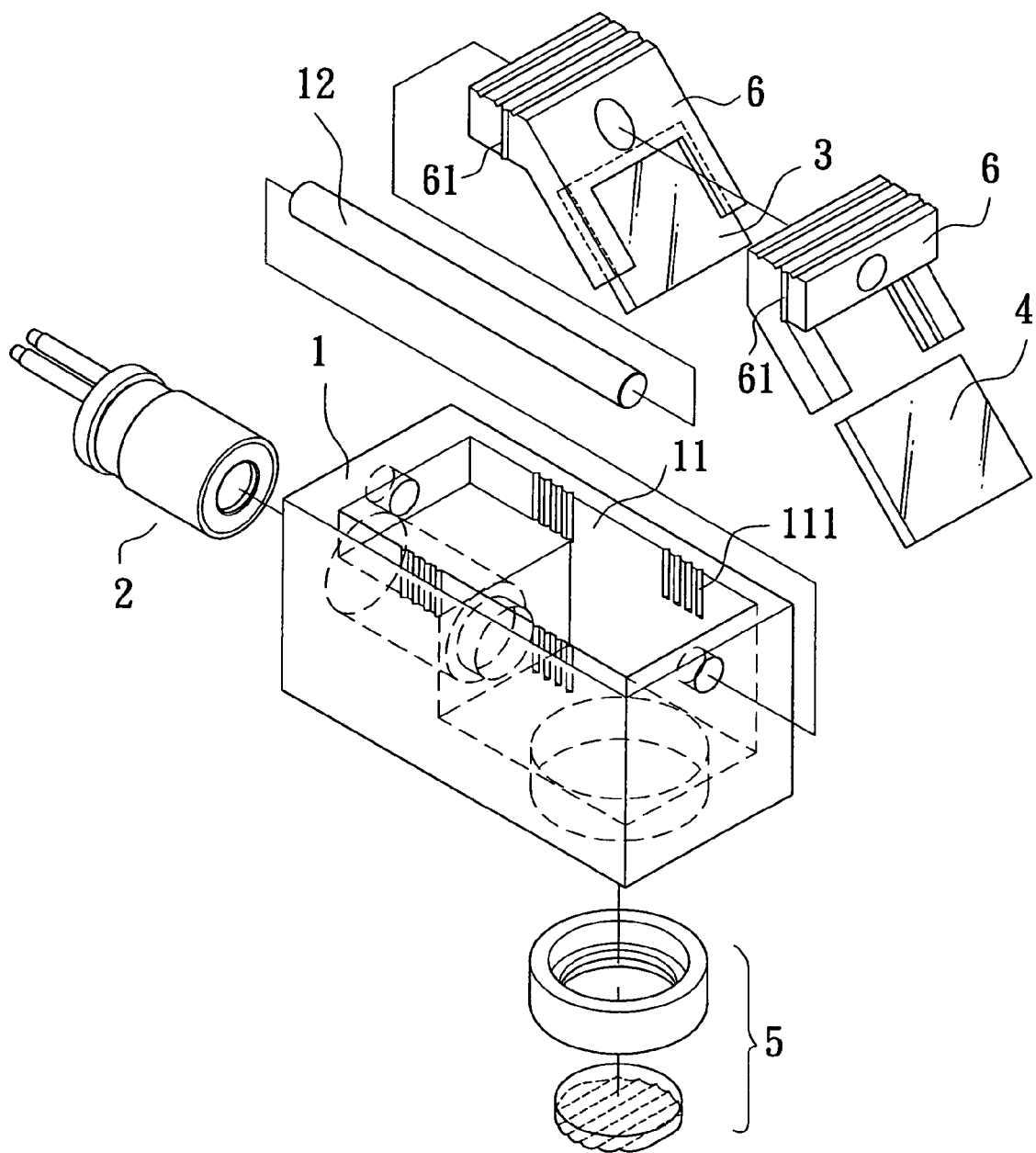
FIG. 4 is an exploded perspective view of the second embodiment of a laser marking mechanism according to the present invention.
Figure 5:
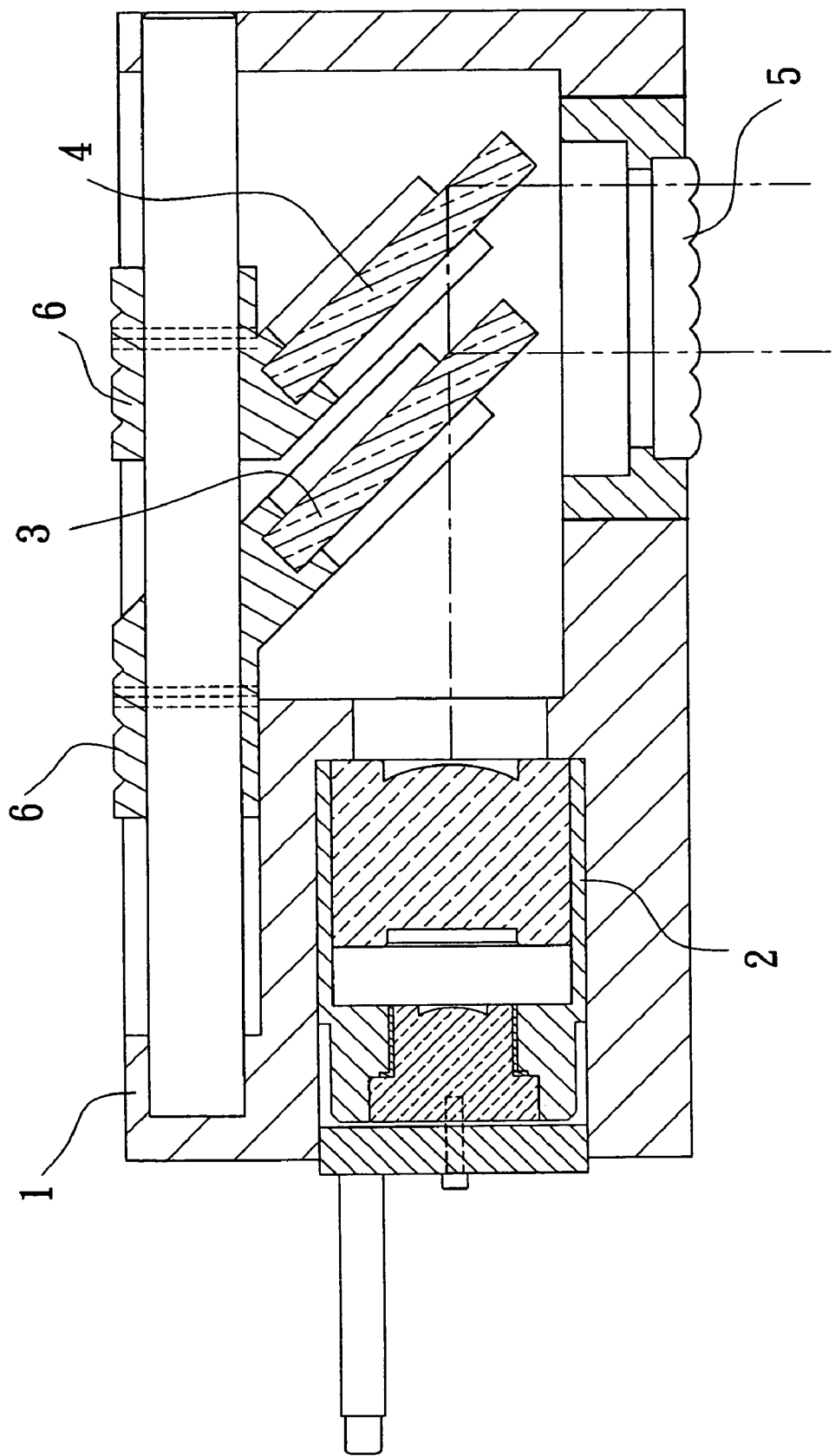
FIG. 5 is a vertical section of the second embodiment.
Figure 6:
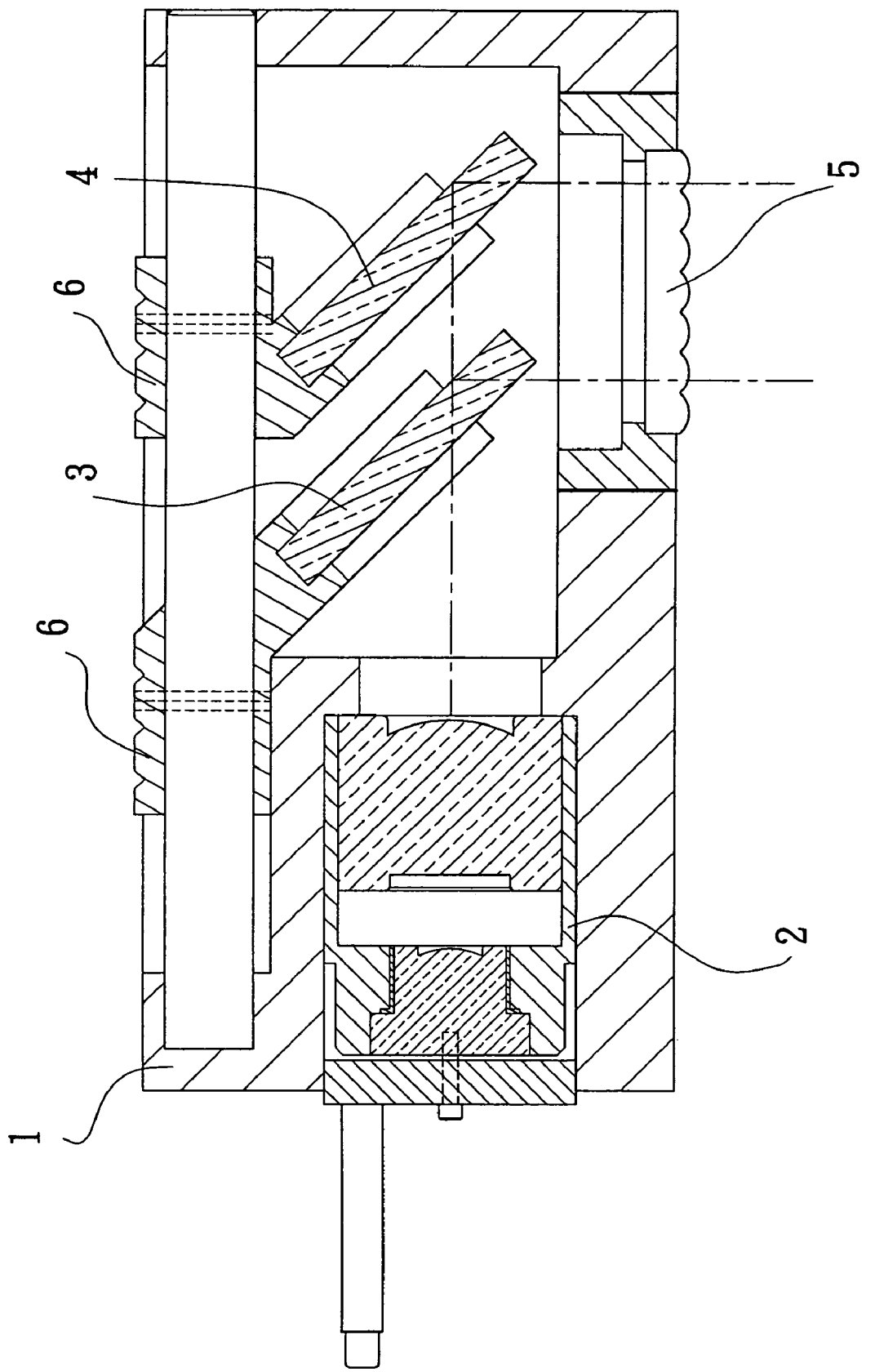
FIG. 6 is a vertical section of the second embodiment with the sliding seats being under adjusted in position.

Referring to FIGS. 4 to 6, a second embodiment of a laser marking mechanism includes a housing 1 having a holding room 11, and two sliding seats 6 linearly displaceable in the holding room 11. First and second reflecting lenses 3 and 4 are respectively fitted to the sliding seats 6, sloping and parallel. The housing 1 has a supporting rod 12 secured thereto and passed through the sliding seats 6 such that the seats 6 can be displaced in the direction of the supporting rod 12. In addition, the housing 1 has two opposing inner sides, which are parallel to the supporting rod 12, and formed with spaced locating trenches 111 thereon. And, the sliding seats 6 have fitting protrusions 61 on lateral sides thereof, which are fitted on selected ones of the locating trenches 111 for helping hold the sliding seats 6 in position. Therefore, the distance between the lenses 3 and 4 can be adjusted by means of displacing the supporting seats 6 relative to each other along the supporting rod 12, thus adjusting the positions of two light lines on a flat surface facing a lens 5, which are formed by means of the present laser marking mechanism.

Figure 7:
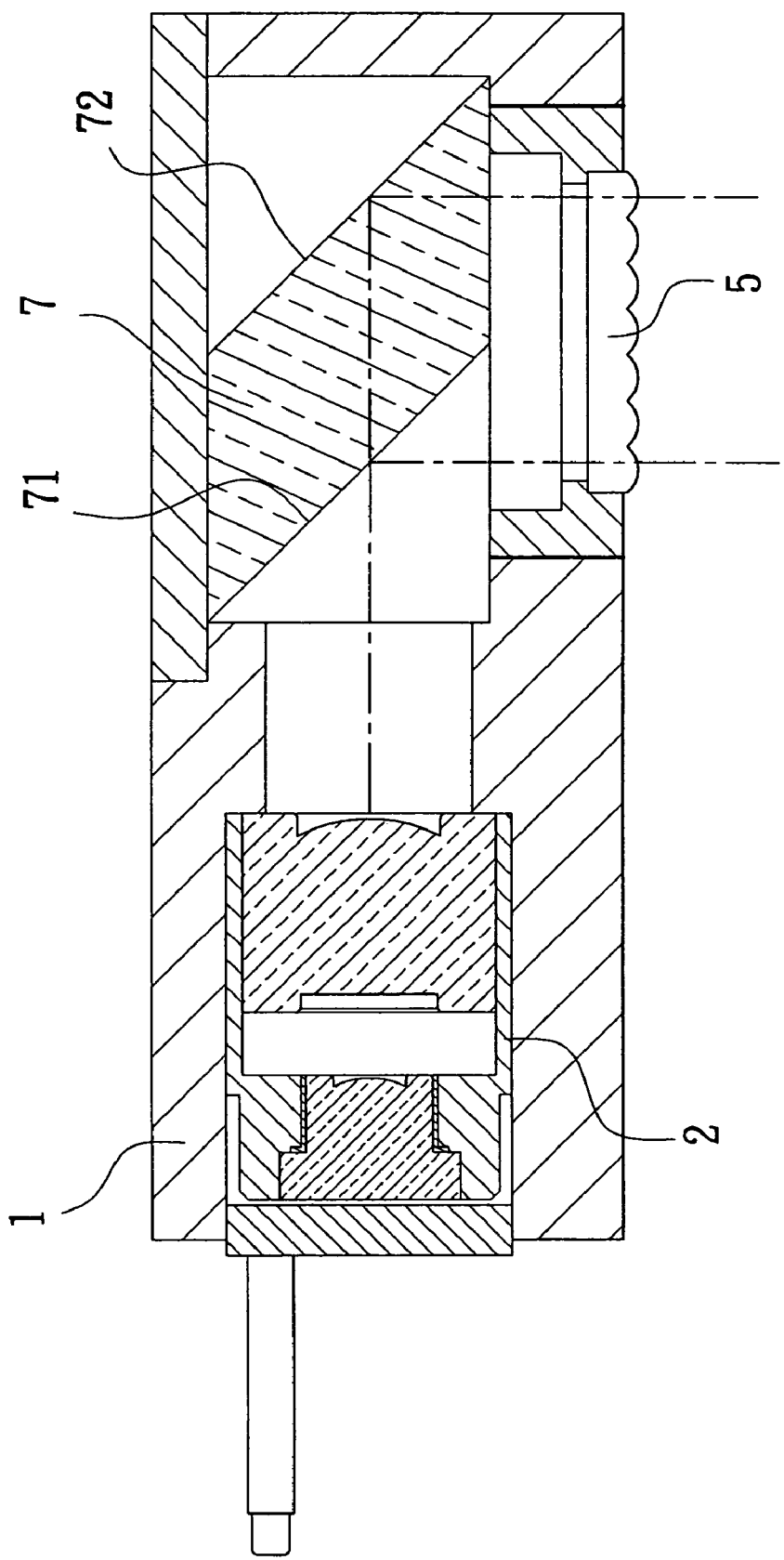
FIG. 7 is a view of the third embodiment of a laser marking mechanism according to the present invention.

Referring to FIG. 7, a third embodiment of a laser marking mechanism includes laser module 2, and lens 5, and it is equipped with a prism 7 instead of lenses 3 and 4 of above embodiments; the laser module 2 and the lens 5 face two perpendicular directions, and the prism 7 is positioned substantially at the intersection of the two perpendicular directions. When a laser beam is emitted from the laser module 2, a first side 71 of the prism 7 will reflect a part of the beam to the lens 5 directly, and a second side 72 of the prism 7 will reflect another part of the beam to the lens 5. Therefore, the present embodiment can make two light lines form on a surface facing the lens 5, like the above embodiments.

Figure 8:
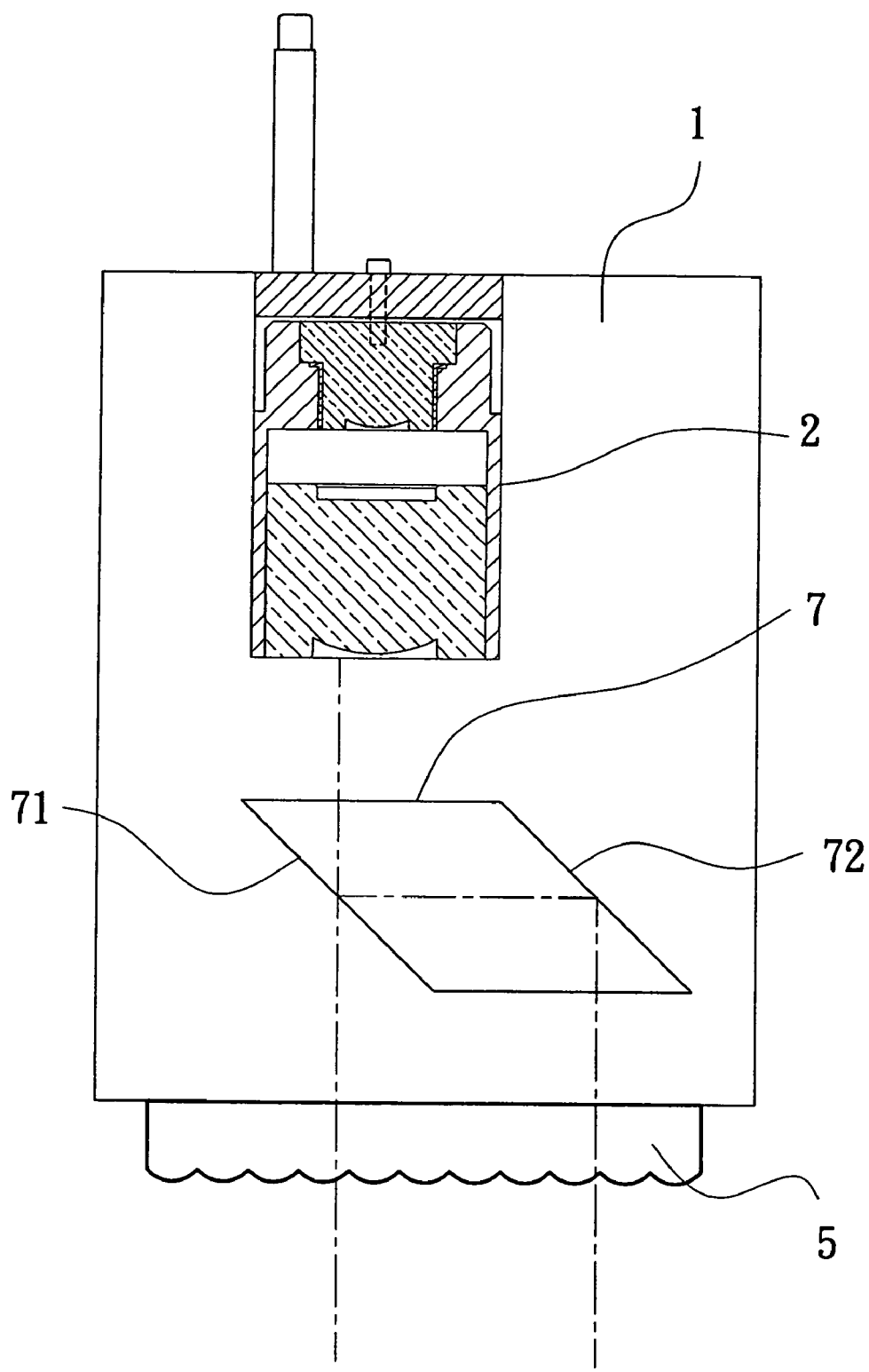
FIG. 8 is a view of the fourth embodiment of a laser marking mechanism according to the present invention.

Referring to FIG. 8, a fourth embodiment of a laser marking mechanism includes laser module 2, and lens 5, and it is equipped with prism 7 instead of lenses 3 and 4; the laser module 2 and the lens 5 face the same direction, and the prism 7 is positioned between the laser module 2 and the lens 5. When a laser beam is emitted from the laser module 2, a part of the beam will travel through a first side 71 of the prism 7 and to the lens 5 directly, and the first side 71 will refract another part of the laser beam to a second side 72 of the prism 7, which will then reflect this part of beam to the lens 5. Therefore, the present embodiment can make two light lines show on a surface facing the lens 5, like the above embodiments.

From the above description, it can be easily understood that the present laser marking mechanism has the following advantages:

1. Two light lines can be formed on the surface of an object by means of the laser marking mechanism before a next action is carried out on the object.

2. With the lens having a corrugated side with all straight ridges thereon being in the same direction, one can use the laser marking mechanism to form two parallel light lines on an object in carrying out measurement and cutting process on the object.

3. With the lens, which has a first corrugated portion, and a corrugated portion whose ridges are perpendicular to those of the first portion, one can use the marking mechanism to form two intersecting light lines on an object in carrying out drilling process and measurement on the object.

4. With the sliding seats 6 linearly displaceable in the housing 1, the distance between the reflecting lenses 3 and 4 can be adjusted.

What is claimed is:

1. A laser marking mechanism, comprising
   a housing;
   a laser module disposed in the housing; the laser module having a laser emitting end directed at an inside of the housing;
   first and second reflecting lenses disposed in front of the laser emitting end of the laser module in the housing, sloping and parallel to each other, for making a laser beam emitted from the laser emitting end of the laser module become two laser beams; and
   a third lens arranged in the housing, next to the first and the second reflecting lenses and across passages of the two laser beams, for changing the two laser beams from the reflecting lenses in such a way that the laser beams will form two light lines on a surface of an object.

2. The laser marking mechanism a claimed in claim 1, wherein the third lens has a corrugated side with all straight ridges thereon being in a same direction such that the two light lines on the surface of the object are parallel.

3. The laser marking mechanism a claimed in claim 1, wherein the third lens has first and second corrugated portions on one side thereof; ridges on the first corrugated portion being perpendicular to those of the second corrugated portion such that the two light lines on the surface of the object are perpendicular.

4. The laser marking mechanism a claimed in claim 1, wherein the housing has two sliding seats linearly displaceable therein, and a supporting rod secured thereto and passing trough the sliding seats while the first and the second reflecting lenses are respectively fitted to the sliding seats.

5. The laser marking mechanism a claimed in claim 4, wherein the housing has two opposing inner sides on two sides of the supporting rod, and the sliding seats have fitting protrusions on lateral sides thereof; opposing inner sides being formed with spaced locating trenches; the fitting protrusions being fitted on selected ones of the locating trenches for helping hold the sliding seats in position.

6. A laser marking mechanism, comprising
   a housing;
   a laser module disposed in the housing; the laser module having a laser emitting end directed at an inside of the housing for emitting a laser beam therefrom;
   a prism in the housing; the prism being positioned along a passage of a laser beam from the laser module for changing the laser beam into two laser beams; and
   a lens arranged in the housing, across passages of the two laser beams from the prism, for changing the two laser beams in such a way that the laser beams will form two light lines on a surface of an object;
   the laser emitting end and the lens facing two perpendicular directions; the prism being positioned substantially at an intersection of the two perpendicular directions.

7. A laser marking mechanism, comprising
   a housing;
   a laser module disposed in the housing; the laser module having a laser emitting end directed at an inside of the housing for emitting a laser beam therefrom;
   a prism in the housing; the prism being along a passage of a laser beam from the laser module for changing the laser beam into two laser beams; and
   a lens arranged in the housing, across passages of the two laser beams from the prism, for changing the two beams in such a way that the beams will form two light lines on a surface of an object;
   the laser emitting end and the lens facing a same direction; the prism being positioned between the laser module and the lens.

* * * * *